United States Patent [19]

Isogaya et al.

[11] 4,331,451

[45] May 25, 1982

[54] CATALYTIC GASIFICATION

[75] Inventors: Kazuyoshi Isogaya, Yokohama; Eiiti Sugiyama, Odawara; Kenji Yoshida; Katsutoshi Kikuchi, both of Fujisawa, all of Japan

[73] Assignees: Mitsui Toatsu Chemicals, Inc.; Toyo Engineering Corporation, both of Tokyo, Japan

[21] Appl. No.: 117,915

[22] Filed: Feb. 4, 1980

[51] Int. Cl.³ .............................................. C01B 3/38
[52] U.S. Cl. ................................. 48/214 A; 48/215; 252/373; 423/652; 423/654
[58] Field of Search ............ 48/214 A, 215; 252/373; 423/652, 654

[56] References Cited

U.S. PATENT DOCUMENTS

| | | | |
|---|---|---|---|
| 3,256,207 | 6/1966 | Arnold | 423/654 |
| 3,396,124 | 8/1968 | Taylor et al. | 48/214 A |
| 3,421,871 | 1/1969 | Davies | 48/214 A |
| 3,429,678 | 2/1969 | Milbourne et al. | 48/214 A |
| 3,467,506 | 9/1969 | Roche | 48/214 A |
| 3,726,654 | 4/1973 | Baron et al. | 252/373 |
| 3,759,679 | 9/1973 | Franz et al. | 48/214 A |
| 3,957,681 | 5/1976 | Tomita et al. | 48/214 A |
| 4,000,988 | 1/1977 | Uemoto et al. | 48/214 A |
| 4,046,869 | 9/1977 | Dorawala et al. | 48/214 A |
| 4,101,449 | 7/1978 | Noda et al. | 48/214 A |

FOREIGN PATENT DOCUMENTS 2902845 8/1979 Fed. Rep. of Germany ...... 252/373
848319 9/1960 United Kingdom ............ 48/214 A

OTHER PUBLICATIONS

"The Condensed Chemical Dictionary", by Hawley, 1974, pp. 410 & 496.

Primary Examiner—S. Leon Bashore, Jr.
Assistant Examiner—Michael L. Goldman
Attorney, Agent, or Firm—Blanchard, Flynn, Thiel, Boutell & Tanis

[57] ABSTRACT

A process for catalytic gasification of heavy oil of a specific gravity of higher than 0.7 with steam or steam/oxygen-containing gas characterized in that the heavy oil is contacted with chromium oxide catalyst or a catalyst comprising a mixture of chromium oxide and one or more of alkaline earth metal oxides, aluminum oxide, zirconium oxide, nickel oxide and cobalt oxide.

More particularly, the present invention relates to a process for catalytic gasification of heavy oil of a specific gravity of higher than 0.7 characterized in that the heavy oil is contacted with a gasification catalyst comprising calcium aluminate, an alkali aluminate or tungsten-containing nickel and then the heavy oil is further contacted with said chromium oxide catalyst or chromium oxide-containing catalyst.

6 Claims, No Drawings

CATALYTIC GASIFICATION

BACKGROUND OF THE INVENTION

1. Field of the Invention

The present invention relates to a process for obtaining a gas of a very low methane content but rich in hydrogen and carbon monoxide by continuous catalytic gasification of heavy oil having a specific gravity of higher than 0.7.

2. Description of Prior Art

As processes for the gasification of natural gas and light hydrocarbons of petroleum fractions up to naphtha, there have been known the partial oxidation process and the steam reforming process wherein a nickel catalyst is used, and the partial oxidation process wherein a catalyst is not used. On the other hand, for the gasification of hydrocarbons containing heavy distillates such as kerosene, gas oil and No. 2 fuel oil and heavy residues such as crude oil, atmospheric residue and vacuum residue, only the non-catalytic partial oxidation process is employed on an industrial scale.

A gas obtained by the known process wherein heavy oils such as heavy distillate and heavy residue are partially oxidized in the absence of catalyst has a low methane content since the reaction temperature in the partial oxidation is as high as 1300°–1500° C. and, therefore, it is used suitably as an ammonia, methanol or oxo synthesis gas or as hydrogen gas for hydrogenation. However, the non-catalytic partial oxidation process has the following defects:

(1) Expensive oxygen or oxygen-rich air is required in a large amount for maintaining a high reaction temperature.
(2) A great part of the raw oil is spent for the combustion for obtaining a high temperature and, consequently, the yields of $H_2$ and CO are reduced.
(3) A reactor made of a heat-resistant material of a high grade is required because of the high reaction temperature and the life of the reactor is short.
(4) Carbon deposition in an amount of 2–5% based on the raw material is unavoidable and, therefore, the yields of $H_2$ and CO are reduced. Further, a superfluous cost of equipment is necessitated for the removal of carbon and recirculation into the raw material. This is economically disadvantageous.

Various investigations have been made heretofore on the catalytic gasification of heavy oils for the purpose of overcoming said defects of the conventional processes for the partial oxidation of heavy oils. Recently, several processes have been reported, though they have not yet been put into practice on an industrial scale. Those processes mainly comprise contacting a heavy oil with a catalyst containing an alkali metal aluminate or calcium aluminate which is a composite oxide of an alkali metal or alkaline earth metal as the main component or a nickel catalyst containing a tungsten compound to gasify the heavy oil by steam reforming or partial oxidation.

Those processes have a merit that the gasification can be effected at a temperature as low as 800°–1300° C. Therefore, as compared with the non-catalytic partial oxidation process, those processes have the merits of a higher gasification efficiency and a smaller oxygen demand and, in addition, problems of materials of the reactor are less serious. Another merit of those processes is that the carbon deposition is small in amount and, therefore, the apparatus and cost required for the recovery of the carbon deposit are small.

However, after the gasification of the heavy oil in the presence of those catalysts, lower hydrocarbons (particularly methane) remain in a large amount in the resultant gas.

The presence of methane residue in the resultant gas is undesirable when the gas is to be used as a raw material for the synthesis of ammonia or methanol or as an oxo synthesis gas or as a source of hydrogen for hydrogenation, though the methane residue is preferred when the resultant gas is used as a fuel gas.

Thus, depending on the use of the resultant gas, the gas containing a large amount of residual methane is undesirable. The separation of methane residue from the resultant gas requires additional apparatus and energy. This is disadvantageous from both economical and industrial viewpoints.

It has been known that Fe, Co or Ni catalyst used in conventional processes has a remarkable effect of reducing the methane content. However, if this catalyst is used, carbon is easily deposited, thereby deteriorating the catalytic capacity and in case of a fixed bed system, the catalyst bed is sometimes clogged to make it impossible to continue the operation. Though it is effective for the prevention of carbon deposition to increase amount of steam, additional energy is required therefor uneconomically.

It is considered that the methane content of the resultant gas can be reduced by increasing the amount of steam, elevating the reaction temperature or elongating the residence time in the reactor. However, those ideas have a demerit of increasing the energy requirement and the cost of apparatuses. Further, it is difficult to reduce the methane content remarkably by those ideas.

Under circumstances as set forth above, there has been eagerly demanded the development of an economical process for obtaining a gas rich in hydrogen and carbon monoxide by the continuous catalytic gasification of heavy distillates such as kerosene, light oil and No. 2 fuel oil and heavy residue at a temperature as low as 800°–1300° C. substantially without forming hydrocarbon residue, particularly methane residue.

SUMMARY OF THE INVENTION

The object of the present invention is to obtain a gas rich in hydrogen and carbon monoxide but having a very low methane content by the continuous catalytic cracking of heavy distillates of a specific gravity of higher than 0.7 such as kerosene, gas oil and No. 2 fuel oil and heavy residues such as crude oil and atmospheric residue at a temperature as low as 800°–1300° C.

The present invention relates to a process for the catalytic gasification of heavy distillates of a specific gravity of higher than 0.7, such as kerosene and gas oil, with steam and, if necessary, an oxygen-containing gas, characterized in that the heavy distillates are contacted with chromium oxide catalyst or a catalyst comprising a mixture of chromium oxide and one or more of alkaline earth metal oxides, aluminum oxide, zirconium oxide, nickel oxide and cobalt oxide and that the heavy distillates are contacted first with a gasification catalyst which depresses carbon deposition such as calcium aluminate, an alkali aluminate or tungsten-containing nickel catalyst prior to the contact thereof with the chromium oxide catalyst or chromium oxide-containing catalyst.

If a heavy distillate of a specific gravity of higher than 0.7 is contacted with the catalyst mainly comprising chromium oxide according to the process of the present invention, methane residue in the resultant gas can be reduced and carbon deposition can be inhibited.

If the heavy distillate is first contacted with a known gasification catalyst comprising calcium aluminate, an alkali metal aluminate or tungsten-containing nickel which depresses carbon deposition (hereinafter referred to as a first catalyst bed) and then contacted with a catalyst containing chromium oxide as substantially the main component (hereinafter referred to as a second catalyst bed or chromium catalyst), the prevention of carbon deposition can be further completed, the amount of methane residue can be reduced, the gasification temperature can be lowered and the amount of steam to be added can be reduced.

Though the gasification of heavy residues of a specific gravity of higher than 0.7 is difficult in general and carbon is apt to be deposited, the gasification can be effected without causing the carbon deposition on the catalyst bed and methane residue can be reduced remarkably in amount by contacting the heavy residues with the first catalyst bed containing calcium aluminate or the like and then with the second catalyst bed.

The catalysts used for the gasification have excellent strength, abrasion resistance, water resistance and gas resistance and they satisfy requirements of industrially demanded physical properties. A very important feature of the present invention is that the gasification can be effected without causing the carbon deposition on the catalyst bed or without poisoning with sulfur.

According to the present invention, the following significant merits can be obtained:

(1) The resultant gas has a low residual methane content and the yields of $H_2$ and CO are high. Therefore, the gas is suitable for the production of synthesis gas to be used for the synthesis of ammonia and methanol.

(2) When the gas is used for the synthesis of ammonia and methanol, the load due to the recycle of methane (inert component) in the synthesis reactor is small, since the methane content of the gas is extremely low. Accordingly, the power cost and capacity of the devices can be reduced economically advantageously.

(3) The load for the separation of methane from $H_2$ and CO can be reduced to also reduce the cost of the apparatus and energy.

According to the process of the present invention, the defects of conventional catalytic gasification processes are overcome as described above and the essential merits of the catalytic gasification processes superior to the non-catalytic processes can be exhibited concretely. Namely, the process of the present invention is superior to the conventional processes in the following points:

(1) Gasification efficiency is higher and yields of $H_2$ and CO are higher, since the reaction temperature is lower by 200°-600° C.

(2) Amount of expensive oxygen required is smaller.

(3) Life of heat-resistant material of which the reactor is made is longer and heat-resistant materials of a high quality are not required.

(4) By the use of the catalyst, carbon deposition is reduced in amount and, consequently, yields of $H_2$ and CO are increased. Therefore, the resultant gas is suitable for the preparation of synthesis gas and a device for carbon recovery can be made smaller economically advantageously.

DETAILED DESCRIPTION OF THE INVENTION

The term "heavy distillates" herein indicates distillation fractions of a specific gravity of higher than 0.7 such as kerosene, gas oil and No. 2 fuel oil. The term "heavy residue" herein indicates hydrocarbon oils containing a residue remaining at the bottom of a distillation column after an ordinary distillation operation such as crude oil, atmospheric residue and vacuum residue of a specific gravity of higher than 0.8. The term "heavy oil" herein includes both heavy distillate and heavy residue.

Processes for the catalytic gasification of the heavy distillate or heavy residue have yet not been put into practice on an industrial scale. The present invention provides a novel industrial process for the catalytic gasification of the heavy oils. More particularly, the present invention provides a process for the catalytic gasification of the respective heavy distillate and heavy residue.

The process of the present invention for the catalytic gasification of heavy distillate with steam or steam/oxygen-containing gas is characterized in that the heavy distillate is contacted with chromium oxide catalyst or a catalyst comprising a mixture of chromium oxide and one or more of alkaline earth metal oxides, aluminum oxide, zirconium oxide, nickel oxide and cobalt oxide.

The chromium oxide-containing catalysts (chromium catalysts) have a chromium oxide content of 50-100 wt. %. The catalytic cracking activity of the catalyst is mainly due to the chromium oxide. Further, chromium oxide may be mixed with one or more of aluminum oxide, zirconium oxide, alkaline earth metal oxides, nickel oxide and cobalt oxide for the purpose of modifying the physical properties such as the strength of the catalyst or inhibiting the carbon deposition or as a promotor or filler. However, if the chromium oxide content is less than 50 wt. %, the methane residue is increased in amount and the economical advantage of the process is reduced.

The chromium catalyst of the present invention has characteristic features of inhibiting the carbon deposition and accelerating the methane decomposition. For allowing the catalyst to exhibit those characteristic features, the following conditions are required: The heavy distillate is contacted with the catalyst at a temperature of 800°-1300° C. Namely, temperature at the exit of the catalyst bed must be at least 800° C. At a lower temperature, the carbon deposition cannot be avoided, the operation becomes unstable and methane residue is increased in amount unfavorably. At a temperature above 1300° C., energy consumption for the gasification becomes excessive uneconomically. Thus, the preferred temperature at the exit of the catalyst bed is 800°-1300° C.

The smaller is the amount of steam, the higher is the economy of the process. However, if the amount of steam is insufficient, carbon is easily deposited and methane residue is increased in amount. Preferred S/C [steam (mole)/number of carbon atoms] in the starting oil is 0.3-7.

Preferred residence time in the catalyst bed is 0.1-10 seconds. If the residence time is less than 0.1 second, methane decomposition is insufficient and carbon is apt to be deposited.

The methane decomposition becomes more complete as the pressure is reduced. However, judging from the size of the equipment and total economy of the process, pressures ranging from atmospheric pressure to 100 atms. are preferred.

Another important requirement is to regulate the conditions prior to the introduction into the catalyst bed. First, the heavy distillate must be thoroughly mixed with a gasifying agent (steam or steam/oxygen-containing gas). The heavy distillate may be vaporized before it is mixed with the gasifying agent or, alternatively, the liquid heavy distillate may be atomized with a part or the whole of the gasifying agent for the mixing. In the latter case, the velocity of the atomizing gas injected through a nozzle is desirably higher than 100 m/sec. Temperature of the thoroughly mixed heavy distillate and gasifying agent at an inlet of the catalyst bed must be higher than 500° C. At a lower temperature, carbon deposition is caused easily on the catalyst bed. For this reason, temperature of the mixture of the heavy distillate and gasifying agent at the exit of the nozzle of the reactor must be higher than 300° C.

Another important condition is that the residence time of the mixture of heavy distillate and gasifying agent fed through the nozzle in a space before it reaches the catalyst bed is 0.05–5 seconds. If the residence time is shorter than 0.05 second, the carbon deposition is caused in an upper part of the catalyst layer. If the residence time is longer than 5 seconds, on the other hand, carbon is deposited in said space and it might clog the catalyst bed. The term "residence time" herein indicates a substantial time of residence which is different from a value calculated by dividing space volume by flow rate. Namely, it is undesirable that the space before the inlet of the catalyst bed has a dead zone and a part of the heavy distillate and the gasifying agent is resident therein for longer than 5 seconds, even though the total average residence time is within 5 seconds. It is important that the shape of the space in the reactor is designed so that such a great distribution of residence time is not caused. In case the shape cannot be changed, it is required to introduce a gasifying agent such as steam or air or the resultant gas through the dead space or to circulate the resultant gas therein so as to eliminate the excessive residence part.

The heavy distillate can be catalytically gasified by contacting the heavy distillate and a gasifying agent with a chromium catalyst under restricted conditions as described above. In addition, the catalytic gasification can also be effected by the following process.

The process comprises contacting the heavy distillate with a gasification catalyst which depresses carbon deposition such as calcium aluminate, an alkali aluminate or a tungsten-containing nickel catalyst and then contacting the same with said chromium catalyst.

This process is characterized in that the carbon deposition is prevented as far as possible by contacting the heavy distillate with a first catalyst bed which depresses carbon deposition and that the operation flexibility is improved because of not requiring the severe gasification conditions such as the space between the nozzle and the catalyst bed, mixing condition in the catalyst bed, temperature and residence time.

Further, economical merits of the process are expected in some cases as described below.

For the completion of gasification, the residence times in the first catalyst bed and the chromium catalyst bed must be prolonged or the gasification temperature must be elevated, since gasification activity is low and a considerable amount of methane remains, even though the catalyst in the first catalyst bed has an excellent effect of preventing carbon deposition. It might be considered that the effect of economization is poor from only this point of view. However, it is to be noted that as compared with the gasification in the presence of only the chromium catalyst, the amount of steam can be reduced and the gasification temperature can be reduced, since the carbon deposition is inhibited even though the residence time is prolonged under the same conditions. They are factors for improving the economical merits of the process. Thus, the process has both positive and negative economical factors and, therefore, it cannot be evaluated indiscriminately. Either the process for the gasification in the presence of only chromium catalyst or the process for the gasification in the presence of the combination of said catalyst with the first catalyst bed may be selected in consideration of the use of resultant gas, the conditions of location of the plant, the properties of the heavy distillate, the costs of the starting oil and the utilities and construction cost of the plant.

On the other hand, in the treatment of a heavy residue containing distillation residue, the problem of carbon deposition is far more serious. If the chromium catalyst is used alone, the carbon deposition cannot be prevented even if gasification conditions such as temperature, residence time, amount of steam and atomizing method are altered considerably. For the prevention of carbon deposition on the catalyst bed in the gasification of the heavy residue, it is indispensable to contact the heavy residue with the first catalyst bed prior to the contact thereof with the chromium catalyst. By contacting the heavy residue then with the chromium catalyst, methane the content of the resultant gas can be reduced.

Now, description will be made on the process of the present invention for the gasification of heavy distillates and heavy residues wherein they are contacted with the first catalyst bed and then the chromium catalyst.

The first and the second catalyst beds may be located close to each other or, alternatively, they may be located separately from each other to such an extent that no ill influence is given by the space between them. The distance between them is such that the time required of the mixture for moving from the first catalyst bed to the second catalyst bed is preferably within several seconds. The first and the second catalyst beds may comprise any combination of fixed bed, fluidized bed and moving bed.

A gasifying agent such as steam, oxygen or oxygen-rich gas may further be introduced between the first and the second catalyst beds. In an embodiment, steam reforming is effected in the first bed and partial oxidation is effected in the second bed.

The two-bed gasification process using said catalysts is characterized in that higher hydrocarbons are converted into lower hydrocarbons such as $CH_4$, $C_2H_4$ and $C_3H_6$ in addition to $H_2$, $CO$, $CO_2$ and $H_2O$ in the presence of the first catalyst bed in the upper part of the reaction zone and then the cracking and gasification of the hydrocarbons are completed in the second catalyst bed in the lower part of the reaction zone.

The two catalyst beds are used in the process of the present invention. The first catalyst bed is filled with calcium aluminate, an alkali aluminate or tungsten-containing nickel. The second catalyst bed is filled with chromium oxide or a chromium oxide-containing catalyst.

The calcium aluminate, alkali aluminate or tungsten-containing nickel catalyst is a catalyst containing as the main component an alkali aluminate or calcium aluminate which is a known alkali metal or alkaline earth metal composite oxide or a tungsten compound containing nickel catalyst.

A preferred filling rate in the first catalyst bed and the second catalyst bed cannot be determined indiscriminately, since it varies depending on the properties of the starting oil and the residence time in the catalyst bed. The higher is the rate in the second catalyst bed, the higher is the hydrocarbon-cracking activity and the lower is the methane residue in the resultant gas.

In the gasification of a starting oil containing heavy residue such as atmospheric residue or vacuum residue, if the amount of the first catalyst bed is extremely small, the higher hydrocarbons are contacted with the second catalyst bed before they have been converted sufficiently into lower hydrocarbons such as $CH_4$, $C_2H_4$ and $C_3H_6$ and, consequently, carbon is easily deposited on the second catalyst bed. If the filling rate in the second catalyst bed exceeds 90 vol. % at a superficial velocity in the column of 200 $hr^{-1}$ based on the resultant gas of atmospheric pressure, a very small amount of carbon deposit is observed on the catalyst. If the filling rate is less than 25 vol. %. the methane residue is increased in amount. Therefore, the preferred filling rate in the second catalyst bed is 30-80 vol. %.

In the gasification of distillates such as kerosene, gas oil and U.S. No. 2 fuel oil, the filling rate in the second catalyst bed can be increased, since the carbon deposition on the catalyst is smaller than in case of heavy residue. Preferred filling rate is generally higher than 50%, though it varies depending on gasification conditions such as steam ratio and temperature. When those oils are used, they can be gasified to yield carbon-free gases which are suitable as ammonia, methanol or oxo synthesis gas or as a starting gas of fuel cells.

Reaction conditions for carrying out the present invention are as described below:

Preferred reaction temperature is 800°-1300° C., particularly 800°-1100° C. At a reaction temperature of below 800° C., carbon is easily deposited on the catalyst bed sometimes to clog the catalyst bed and the continuous operation becomes difficult. Preferred steam ratio [steam (mole)/carbon (mole)] is above 0.3, particularly 0.3-7. If the steam ratio is lower, carbon is deposited on the catalyst bed and, on the other hand, a higher steam ratio is uneconomical. Preferred gasification pressure ranges from atmospheric pressure to 100 $Kg/cm^2$ and preferred residence time in the reaction zone is 0.1-10 seconds.

The oxygen-containing gas used for the gasification by the partial oxidation may be air, oxygen or a mixture of air and oxygen in any desired ratio.

For further understanding of the present invention, examples of the preparation of catalysts and reaction operations will be given, which by no means limit the technical scope of the present invention.

Preparation of catalyst of the first catalyst bed (catalyst A)

643 Parts of aluminous cement (comprising 80% of $Al_2O_3$ and 19.5% of CaO) were mixed with 476 parts of calcium hydroxide. The mixture was molded, calcined at 1300° C. for two hours and then pulverized. Thus resultant powder was kneaded with 5 wt. % and 15 wt. %, based on the powder, of wheat flour and CMC solution of 1.5% concentration, respectively. The mixture was molded into tablets of a diameter of 10 mm and a height of 10 mm. The tablets were calcined at 1330° C. for 6 hours. Thus obtained calcium aluminate catalyst had a compression strength of 350 $Kg/cm^2$ and an excellent water resistance.

X-Ray diffraction of the catalyst revealed that the main component was $12CaO.7Al_2O_3$ and a small amount of $3CaO.7Al_2O_3$ was recognized.

Preparation of catalysts of the first catalyst bed (catalysts B and C)

One molecular amount of potassium carbonate was mixed with 6-molecular amount of aluminum hydroxide. The mixture was molded, calcined at 1500° C. for one hour and then pulverized. Thus resultant powder was kneaded with 5 wt. % and 15 wt. %, based on the powder, of sawdust and CMC solution of 1.5% concentration, respectively. The mixture was molded into tablets of a diameter of 10 mm and a height of 10 mm. The tablets were calcined at 1500° C. for 6 hours to obtain catalyst B. In the same manner, catalyst C was prepared from sodium carbonate and aluminum hydroxide. Those alkali aluminate catalysts had a compression strength of higher than 300 $Kg/cm^2$ and an excellent water resistance.

X-Ray diffraction of the catalysts revealed that the main component of them was $RAl_5O_8$ and a small amount of $R_2Al_{24}O_{37}$ was recognized (R being K or Na).

Preparation of catalyst of the second catalyst bed (catalyst D)

100 Parts of chromium oxide were kneaded together with 1.5 wt. %, based on chromium oxide, of CMC solution of 1.8 wt. % concentration. The mixture was molded into tablets of a diameter of 10 mm and a height of 10 mm. The tablets were calcined at 1300° C. for 3 hours.

Thus obtained catalyst had an excellent water resistance and a compression strength of 100-200 $Kg/cm^2$. In handling the catalyst, a slight pulverization was recognized but the catalyst was still fit for use.

Preparation of catalyst of the second catalyst bed (catalyst E)

97 Parts of chromium oxide were thoroughly mixed with 3 parts of magnesium oxide. 15 Weight %, based on the powder, of CMC solution of 1.8% concentration was added thereto and the whole was kneaded together and molded into tablets of a diameter of 10 mm and a height of 10 mm. The tablets were calcined at 1300° C. for 3 hours.

Thus obtained catalyst had an excellent water resistance and a compression strength of 450 $Kg/cm^2$. Degree of pulverization of the catalyst in the handling was far reduced as compared with catalyst D.

Preparation of catalysts of the second catalyst bed (catalysts F, G, H, I, J, K and L)

The following catalysts were prepared in the same manner as in the preparation of catalyst E:

| Catalyst | Components (wt. %) | Compression strength | Water resistance |
| --- | --- | --- | --- |
| Catalyst F | $Cr_2O_3$ 95% $Al_2O_3$ 5% | 330 | good |
| Catalyst G | $Cr_2O_3$ 50% $Al_2O_3$ 50% | 350 | " |

| Catalyst | Components (wt. %) | Compression strength | Water resistance |
|---|---|---|---|
| Catalyst H | Cr$_2$O$_3$ 25% Al$_2$O$_3$ 75% | 300 | " |
| Catalyst I | Cr$_2$O$_3$ 95% CaO 5% | 220 | " |
| Catalyst J | Cr$_2$O$_3$ 97% ZrO$_2$ 3% | 400 | " |
| Catalyst K | Cr$_2$O$_3$ 95% NiO 5% | 320 | " |
| Catalyst L | Cr$_2$O$_3$ 95% CoO 5% | 380 | " |

EXAMPLE 1

Kuwait atmospheric residue was partially oxidized with oxygen in the presence of catalyst A or B alone or in the presence of both catalysts A and E in various ratios in the first and the second catalyst beds, respectively, in a reactor according to the present invention. Results of the gasification are shown in Table 1.

It is apparent from Table 1 given below that methane residue in the resultant gas can be reduced remarkably by filling catalysts A and E in the two layers and that there exists a preferred range of filling rates of catalysts A and E.

EXAMPLE 2

Kuwait atmospheric residue was partially oxidized with oxygen in the presence of catalyst A filled in the first catalyst bed and one of catalysts D, F, G, H, I, J, K and L in the second catalyst bed in a reactor. Results are shown in Table 2. Carbon deposition on the catalyst beds was not recognized in all cases.

EXAMPLE 3

Kuwait crude oil, atmospheric residue and vacuum residue were subjected to continuous, catalytic gasification in the presence of 25 vol. % of catalyst A or B filled in the first catalyst bed and 75 vol. % of catalyst E filled in the second catalyst bed under various reaction conditions. Results are shown in Table 3. In all cases, methane residue in the resultant gas was very small and no carbon deposition on the catalyst bed was recognized at all.

TABLE 1

| | Run No. | | | | |
|---|---|---|---|---|---|
| | 1 | 2 | 3 | 4 | 5 |
| Catalyst | | | | | |
| first bed | A | B | A 10 vol. % | A 25 vol. % | A 75 vol. % |
| second bed | A | B | E 90 vol. % | E 75 vol. % | E 25 vol. % |
| Reaction conditions | | | | | |
| pressure (Kg/cm$^2$) | 1.0 | 1.0 | 1.0 | 1.0 | 1.0 |
| Temp. (°C.) (Note 1) | 1000 | 1000 | 1000 | 1000 | 1000 |
| steam ratio (mole/carbon mole) | 1.5 | 1.5 | 1.5 | 1.5 | 1.5 |
| ratio to theoretical oxygen (Note 2) | 0.295 | 0.295 | 0.295 | 0.295 | 0.295 |
| GHSV (hr$^{-1}$) (Note 3) | 200 | 200 | 200 | 200 | 200 |
| Resultant gas | | | | | |
| H$_2$ | 50.4 | 51.6 | 57.3 | 57.3 | 57.1 |
| CO | 26.0 | 25.3 | 28.5 | 28.5 | 28.4 |
| CO$_2$ | 17.0 | 17.2 | 13.5 | 13.5 | 13.5 |
| CH$_4$ | 5.9 | 5.2 | 0.00 | 0.00 | 0.38 |
| C$_2$H$_4$ | 0.1 | 0.08 | 0 | 0 | 0 |
| C$_2$H$_6$ | trace | 0 | 0 | 0 | 0 |
| H$_2$S | 0.6 | 0.6 | 0.6 | 0.6 | 0.6 |
| Carbon deposition | | | | | |
| on catalyst bed | none | none | trace of carbon deposit | none | none |
| in the resultant gas (wt. %) (Note 4) | 0.40 | 0.52 | 0.30 | 0.28 | 0.30 |
| Experiment time (hr) | 5.0 | 5.0 | 5.0 | 5.0 | 5.0 |

TABLE 2

| | Run No. | | | | | | | |
|---|---|---|---|---|---|---|---|---|
| | 6 | 7 | 8 | 9 | 10 | 11 | 12 | 13 |
| Catalyst | | | | | | | | |
| first bed (25 vol. %) | A | A | A | A | A | A | A | A |
| second bed (75 vol. %) | D | F | G | H | I | J | K | L |
| Reaction conditions | | | | | | | | |
| pressure Kg/cm$^2$ | 1.0 | 1.0 | 1.0 | 1.0 | 1.0 | 1.0 | 1.0 | 1.0 |
| temp. °C. | 1000 | 1000 | 1000 | 1000 | 1000 | 1000 | 1000 | 1000 |
| steam ratio (mole/carbon mole) | | | | | | | | |
| ratio to theoretical oxygen (—) | 0.295 | 0.295 | 0.295 | 0.295 | 0.295 | 0.295 | 0.295 | 0.295 |
| GHSV (hr$^{-1}$) | 200 | 200 | 200 | 200 | 200 | 200 | 200 | 200 |
| Resultant gas | | | | | | | | |
| H$_2$ | 57.1 | 53.1 | 56.1 | 55.9 | 56.0 | 57.2 | 56.5 | 56.2 |
| CO | 28.7 | 34.3 | 30.0 | 29.0 | 30.5 | 27.5 | 30.2 | 29.8 |
| CO$_2$ | 13.6 | 12.0 | 13.2 | 13.6 | 12.4 | 14.5 | 12.7 | 13.4 |
| CH$_4$ | 0.00 | 0.02 | 0.10 | 0.48 | 0.03 | 0.02 | 0.00 | 0.01 |
| C$_2$H$_4$ | 0.0 | 0.0 | 0.0 | trace | 0.0 | 0.0 | 0.0 | 0.0 |
| H$_2$S | 0.6 | 0.6 | 0.6 | 0.6 | 0.6 | 0.6 | 0.6 | 0.6 |
| Carbon deposition | | | | | | | | |
| on catalyst bed | none | none | none | none | none | none | none | none |
| in the resultant gas (wt. %) | 0.36 | 0.56 | 0.37 | 0.43 | 0.38 | 0.52 | 0.38 | 0.33 |

TABLE 2-continued

| | Run No. | | | | | | | |
|---|---|---|---|---|---|---|---|---|
| | 6 | 7 | 8 | 9 | 10 | 11 | 12 | 13 |
| Experiment time (hr) | 5.0 | 5.0 | 5.0 | 5.0 | 5.0 | 5.0 | 5.0 | 5.0 |

TABLE 3

| | Run No. | | | | |
|---|---|---|---|---|---|
| | 14 | 15 | 16 | 17 | 18 (Note 5) |
| Catalyst | | | | | |
| first bed (25 vol. %) | B | A | A | A | A |
| second bed (75 vol. %) | E | E | E | E | E |
| Starting oil | crude oil | Atmospheric residue | Atmospheric residue | Vacuum residue | Vacuum residue |
| Reaction conditions | | | | | |
| pressure (Kg/cm$^2$) | 6 | 1 | 9 | 50 | 1 |
| temp. (°C.) | 950 | 1000 | 1000 | 1000 | 1000 |
| steam ratio (mole/carbon mole) | 3.8 | 3.8 | 1.0 | 1.5 | 1.5 |
| ratio to theoretical oxygen (—) | 0 | 0 | 0.282 | 0.305 | 0.325 |
| GHSV (hr$^{-1}$) | 900 | 300 | 1350 | 1350 | 200 |
| Resultant gas | | | | | |
| $H_2$ | 68.8 | 68.4 | 53.0 | 52.5 | 30.2 |
| CO | 17.0 | 17.9 | 34.1 | 34.5 | 14.6 |
| $CO_2$ | 12.0 | 12.9 | 12.1 | 11.4 | 9.6 |
| $N_2$ | 0 | 0 | 0 | 0 | 45.0 |
| $CH_4$ | 0.3 | 0.18 | 0.2 | 0.8 | 0 |
| $H_2S$ | 0.3 | 0.42 | 0.6 | 0.9 | 0.6 |
| Carbon deposition | | | | | |
| on catalyst bed | none | none | none | none | none |
| in the resultant gas (wt. %) | 0.05 | 0.10 | 0.6 | 1.0 | 0.8 |
| Experiment time | 24 | 240 | 30 | 30 | 720 |

(Note 1) Temperature of the gas at the exit of the reactor.
(Note 2) Ratio to theoretical amount of oxygen required for the complete combustion of the starting material.
(Note 3) Space velocity of the gas in the column in standard state.
(Note 4) Wt. % based on the starting oil fed.
(Note 5) In the partial oxidation in Run No. 18, air was used as the oxidized agent.

EXAMPLE 4

Catalyst A or B was filled in the first catalyst bed and catalyst E or L was filled in the second catalyst bed in a reactor. Kerosene, gas oil and No. 2 fuel oil were gasified under various reaction conditions. Results are shown in Table 4. In all cases, methane residue in the resultant gas was very small and no carbon deposition on the catalyst bed or in the resultant gas was recognized at all.

TABLE 4

| | Run No. | | | | | | |
|---|---|---|---|---|---|---|---|
| | 19 | 20 | 21 | 22 | 23 | 24 | 25 |
| Catalyst | | | | | | | |
| first layer (vol. %) | A (10%) | B (10%) | B (20%) | A (20%) | none | none | A (10%) |
| second layer (vol. %) | E (90%) | E (90%) | L (80%) | L (100%) | E (100%) | L (100%) | E (90%) |
| Starting oil | kerosene | gas oil | kerosene | gas oil | gas oil | kerosene | No. 2 Fuel oil |
| Reaction conditions | | | | | | | |
| pressure (Kg/cm$^2$) | 1 | 6 | 1 | 6 | 1 | 6 | 1 |
| temp. (°C.) | 950 | 950 | 1000 | 1000 | 1000 | 1000 | 950 |
| steam ratio (mole/mole) | 1.0 | 1.0 | 1.0 | 3.8 | 1.0 | 3.8 | 1.0 |
| ratio to theoretical oxygen (—) | 0.2381 | 0.2414 | 0.2371 | 0 | 0.2589 | 0 | 0.2404 |
| GHSV (hr$^{-1}$) | 400 | 1200 | 200 | 900 | 400 | 900 | 400 |
| gasifying agent | air | air | oxygen | 0 | air | 0 | air |
| Resultant gas | | | | | | | |
| $H_2$ | 38.6 | 37.3 | 59.3 | 70.1 | 36.4 | 70.3 | 37.6 |
| CO | 20.9 | 20.6 | 32.9 | 17.9 | 20.7 | 17.8 | 21.5 |
| $CO_2$ | 5.32 | 5.65 | 7.66 | 11.9 | 5.39 | 11.78 | 5.54 |
| $N_2$ | 35.1 | 35.9 | 0 | 0 | 37.5 | 0 | 35.3 |
| $CH_4$ | 0.05 | 0.52 | 0.05 | 0.09 | 0.01 | 0.09 | 0.04 |
| $H_2S$ | — | 0.06 | — | 0.08 | 0.06 | — | 0.005 |
| Carbon deposition | | | | | | | |
| on catalyst bed | none | none | none | none | none | none | none |
| in the resultant gas | none | none | none | none | none | none | none |
| Experiment time | 5.0 | 30 | 24 | 5 | 20 | 20 | 5 |

EXAMPLE 5

Catalyst E alone was filled in a reaction tube and light oil was gasified. Residence time before reaching the inlet of the catalyst bed (nozzle end) was varied. Results are shown in Table 5.

TABLE 5

| | Run No. | | | | | | | | |
|---|---|---|---|---|---|---|---|---|---|
| | 26 | 27 | 28 | 29 | 30 | 31 | 32 | 33 | 34 |
| Catalyst | | | | | | | | | |
| first layer | none | none | none | none | none | none | none | none | none |
| second layer | E | E | E | E | E | E | E | E | E |
| Starting oil | gas oil | gas oil | gas oil | gas oil | gas oil | gas oil | gas oil | gas oil | gas oil |
| Pressure Kg/cm$^2$ | 6 | 6 | 6 | 1 | 1 | 1 | 1 | 1 | 1 |
| Temp. (°C.) | 950 | 950 | 950 | 900 | 900 | 900 | 900 | 850 | 850 |
| Steam ratio (mole/mole) | 1.0 | 1.0 | 1.0 | 4.0 | 4.0 | 4.0 | 4.0 | 4.5 | 1.0 |
| Ratio to theoretical oxygen | 0.245 | 0.245 | 0.245 | — | — | — | — | — | 0.219 |
| Catalyst bed GHSV (1/hr) | 800 | 800 | 800 | 400 | 400 | 400 | 400 | 400 | 400 |
| Residence time in a space on the catalyst (sec) | 0.02 | 0.1 | 6 | 0.02 | 0.1 | 2 | 6 | 0.1 | 0.1 |
| Gasifying agent | air | air | air | steam | steam | steam | steam | steam | air |
| Carbon deposition | | | | | | | | | |
| on catalyst | Deposit | None | Deposit | Deposit | None | None | Deposit | None | None |
| in the resultant gas | Positive | Negative | Positive | Positive | Negative | Negative | Positive | Negative | Negative |
| Experiment time | 10 | 24 | 10 | 10 | 24 | 24 | 10 | 24 *1 | 24 *2 |

Remarks
*1 Steam is divided and supplied from the backside of the nozzle.
*2 A conical atomizing space is used.

What is claimed is:

1. A continuous catalytic gasification process for converting heavy hydrocarbon distillate into a product gas which has a very low methane content and high hydrogen and carbon monoxide contents, which consists essentially of: feeding a mixture of (1) heavy hydrocarbon distillate having a specific gravity of higher than 0.7 and (2) steam or a mixture of steam and oxygen-containing gas, wherein the ratio of the number of moles of steam to the number of carbon atoms in said hydrocarbon distillate is from 0.3 to 7, into a reaction zone which is at a pressure of from atmospheric pressure to 100 Kg/cm$^2$; in said reaction zone, first flowing said mixture through a space free of catalyst so that said mixture remains in said space for from 0.05 to 5 seconds and the temperature of said mixture leaving said space is higher than 500° C., then flowing said mixture through a catalyst bed consisting essentially of from 50 to 100 wt. % of chromium oxide and the balance is one or more materials selected from the group consisting of aluminum oxide, zirconium oxide, alkaline earth metal oxides, nickel oxide and cobalt oxide, so that said mixture contacts said catalyst bed for from 0.1 to 10 seconds and is converted into said product gas and said product gas has a temperature of from 800° to 1100° C. when it exits from said catalyst bed, and then discharging said product gas from the reaction zone.

2. A process as claimed in claim 1 in which said heavy hydrocarbon distillate is atomized and said mixture is fed into said reaction zone from a nozzle at a velocity of from 100 m/sec to sonic velocity and at a temperature of higher than 300° C.

3. A continuous catalytic gasification process for converting heavy hydrocarbon distillate into a product gas which has a very low methane content and high hydrogen and carbon monoxide contents, which consists essentially of: feeding a mixture of (1) heavy hydrocarbon distillate having a specific gravity of higher than 0.7 and (2) steam or a mixture of steam and oxygen-containing gas, wherein the ratio of the number of moles of steam to the number of carbon atoms in said hydrocarbon distillate is from 0.3 to 7, into a reaction zone which is at a pressure of from atmospheric pressure to 100 Kg/cm$^2$; in said reaction zone, flowing said mixture through a first catalyst bed consisting essentially of a first catalyst selected from the group consisting of calcium aluminate, alkali metal aluminate and tungsten-containing nickel catalyst, said first catalyst being effective to convert the higher hydrocarbons in said hydrocarbon distillate into lower hydrocarbons, then flowing said mixture through a second catalyst bed consisting essentially of from 50 to 100 wt. % of chromium oxide and the balance is one or more materials selected from the group consisting of aluminum oxide, zirconium oxide, alkaline earth metal oxides, nickel oxide and cobalt oxide, so that said mixture contacts said first and second catalyst beds for a total time of from 0.1 to 10 seconds effective to complete the cracking and gasification of the hydrocarbons and to form said product gas and said product gas has a temperature of from 800° to 1300° C. when it exits from said second catalyst bed, and then discharging said product gas from the reaction zone.

4. A method as claimed in claim 3 in which the volume of the second catalyst bed is from 25 to 90 volume %, based on the total volume of the first and second catalyst beds.

5. A continuous catalytic gasification process for converting hydrocarbon distillation residue into a product gas which has a very low methane content and high hydrogen and carbon monoxide contents, which consists essentially of: feeding a mixture of (1) atomized heavy hydrocarbon distillation residue having a specific gravity of higher than 0.8 and (2) steam or a mixture of steam and oxygen-containing gas, wherein the ratio of the number of moles of steam to the number of carbon atoms in said hydrocarbon distillation residue is from 0.3 to 7, into a reaction zone which is at a pressure of from atmospheric pressure to 100 Kg/cm$^2$; in said reaction zone, flowing said mixture through a first catalyst bed consisting essentially of a first catalyst selected from the group consisting of calcium aluminate, alkali metal aluminate and tungsten-containing nickel catalyst effective to convert the higher hydrocarbons in said hydrocarbon distillation residue into lower hydrocarbons, then flowing said mixture through a second catalyst bed consisting essentially of from 50 to 100 wt. % of chromium oxide and the balance is one or more materials selected from the group consisting of aluminum oxide, zirconium oxide, alkaline earth metal oxides, nickel oxide and cobalt oxide, so that said mixture contacts said first and second catalyst beds for a total time of from 0.1 to 10 seconds effective to complete the cracking and gasification of the hydrocarbons and to form said product gas and said product gas has a temperature of from 800° to 1300° C. when it exits from said second catalyst bed, and then discharging said product gas from the reaction zone.

6. A method as claimed in claim 5 in which the volume of the second catalyst bed is from 25 to 90 volume %, based on the total volume of the first and second catalyst beds.

* * * * *